United States Patent [19]

McLaughlin et al.

[11] 4,032,355

[45] June 28, 1977

[54] BITUMINOUS COMPOSITION

[75] Inventors: Alexander McLaughlin, Meriden, Conn.; Adnan A. R. Sayigh, North Haven, Conn., by Anne B. Sayigh, conservatrix

[73] Assignee: The Upjohn Company, Kalamazoo, Mich.

[22] Filed: Nov. 14, 1975

[21] Appl. No.: 631,823

[52] U.S. Cl. .......................... 106/273 N; 106/279; 106/281 R; 106/282; 208/44; 260/28 R
[51] Int. Cl.² ........................................ C08L 95/00
[58] Field of Search .......... 106/273 N, 279, 281 N, 106/284; 260/28 R; 208/23, 44

[56] References Cited

UNITED STATES PATENTS

| | | | |
|---|---|---|---|
| 3,182,032 | 5/1965 | Charlton et al. | 260/28 |
| 3,615,801 | 10/1971 | Marklow et al. | 106/278 |
| 3,615,802 | 10/1971 | Betty | 106/278 |
| 3,796,583 | 3/1974 | Bungs et al. | 106/273 N |

*Primary Examiner*—Lorenzo B. Hayes
*Attorney, Agent, or Firm*—James S. Rose; Denis A. Firth

[57] ABSTRACT

Novel bituminous compositions are disclosed which are characterized by elevated Ring and Ball softening points ranging up to about 200° C. They are prepared by the treatment of molten bitumen, in the absence of solvent, with a combination of: (a) an amine selected from the class consisting of an aliphatic amine having from 10 to 20 carbon atoms, and aromatic polyamines; and (b) an isocyanate selected from the class consisting of aliphatic isocyanates having from 10 to 20 carbon atoms, and aromatic polyisocyanates; provided that in any instance in which the amine component is aliphatic, then the isocyanate component is aromatic. The combined weight of (a) and (b) present in the bitumen, is from about 1 to about 10 weight percent based on the weight of bitumen. The bituminous compositions are useful in paving, and roofing applications, especially in countries which experience hot climates.

7 Claims, No Drawings

BITUMINOUS COMPOSITION

BACKGROUND OF THE INVENTION

1. Field of the Invention

This invention relates to bituminous compositions and processes for their preparation and is particularly concerned with novel bituminous compositions and processes for their preparation by treatment of bitumen with a combination of an amine and an isocyanate.

2. Description of the Prior Art

Various chemical modifications of bitumen and bituminous substances have been described, which provide for particular improved properties of bitumen in specific end-use applications; see for example, U.S. Pat. Nos. 3,028,249, 3,182,032, 3,179,610, 3,615,801, 3,650,791 and British Patent Nos. 1,393,014 and 1,402,684. Thixotropic gelled bituminous cutback compositions obtained by the in-situ formation of minor amounts of a monomeric disubstituted urea in a bituminous cutback blend containing solvent, are described in U.S. Pat. No. 3,615,802.

The prior art does not disclose a simple, improved bitumen composition, which is characterized by an elevated softening range in comparison to that of the starting bitumen. Generally speaking, untreated bituminous materials, which include asphalts, tars, and pitches, regardless of the source, are characterized by their softening points. For example dead level asphalt, which is generally called a tar by those skilled in the art, has a softening range of about 53° C to 57° C as measured by the standard Ring and Ball (hereinafter R. & B.) softening point determination carried out in accordance with ASTM Test D36-26. One of the highest softening points, 81° C to 85° C, is observed for a bituminous material commonly referred to as steeped asphalt.

Accordingly, in applications such as road surfaces, roof coatings, sealants, caulks and the like, in warm climates and during summer heat, these bitumens drip, run, and generally deform. In severe cases, entire road surfaces have been known to shift.

We have now found a simple, yet elegant, solution for overcoming this deficiency. The bituminous compositions made in accordance with the present invention are set forth in detail hereinbelow.

SUMMARY OF THE INVENTION

This invention comprises a bituminous composition having an elevated softening point said composition comprising the product obtained by treating bitumen, in the molten state and in the absence of solvent, with a combination of:
a. an amine selected from the class consisting of aliphatic monoamines having from 10 to 20 carbon atoms, inclusive, and aromatic polyamines; and
b. an isocyanate selected from the class consisting of aliphatic monoisocyanates having from 10 to 20 carbon atoms, and aromatic polyisocyanates; provided that in any instance in which the amine component (a) is aliphatic the isocyanate component (b) is aromatic; and provided further that amine component (a) is employed in an amount within the range of 0.25 to 3.0 equivalents per equivalent of the isocyanate component (b) and the total weight of amine component (a) plus isocyanate component (b) is from about 1 to about 10 weight percent of said bitumen.

The term "bitumen" means bituminous materials such as asphalts, tars, and pitches which are generally described as mixtures of hydrocarbons, soluble in carbon disulfide, derived from natural or pyrogenous origins, or combinations of both; for a more detailed definition see, Encyclopedia of Polymer Science and Technology, Vol. 2, page 402, 1965, John Wiley & Sons, Inc., New York, N.Y.

The term "aliphatic", as used hereinabove, means alkyl and alkenyl having from 10 to 20 carbon atoms inclusive. Representative of alkyl are decyl, dodecyl, tetradecyl, hexadecyl, octadecyl, eicosanyl, and isomeric forms thereof. Representative of alkenyl are decenyl, dodecenyl, tetradecenyl, hexadecenyl, octadecenyl, eicosenyl, and isomeric forms thereof.

The term "aromatic", as used hereinabove, means an aromatic hydrocarbon residue selected from the group consisting of arylene and the residue

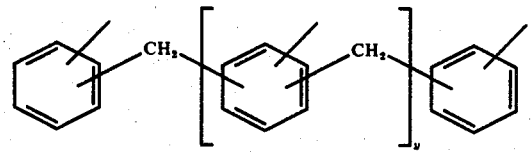

wherein y=0 or a number having an average value from 0 to 1.

The term "arylene" means the radical obtained by removing two nuclear hydrogen atoms from an aromatic hydrocarbon having from 6 to 12 carbon atoms and is inclusive of phenylene, tolylene, naphthylene, biphenylene, and the like.

DETAILED DESCRIPTION OF THE INVENTION

It is an object of the present invention to provide bituminous compositions which are characterized by elevated R. & B. softening points relative to the values for the starting bitumens. It is also an object of the present invention to provide said bituminous compositions with R. & B. softening points which can range up to about 200° C. In yet a further object of the present invention, there are provided bituminous compositions which are soluble in bitumen cutback solvents, known and used by those skilled in the art (see U.S. Pat. No. 3,615,802, col. 2, line 70 to col. 3, line 25).

The foregoing objects are accomplished by treating a bitumen material (I), in the molten state and in the absence of solvent, with a combination of an amine (II) and an isocyanate (III).

The amine (II) is selected from the class consisting of aliphatic monoamines having from 10 to 20 carbon atoms, inclusive, and aromatic polyamines; the isocyanate (III) is selected from the class consisting of aliphatic monoisocyanates having from 10 to 20 carbon atoms, and aromatic polyisocyanates; with the proviso that, in any instance in which (II) is an aliphatic amine, (III) is an aromatic polyisocyanate.

Thus a bitumen sample is heated to at least its softening temperature and preferably above, to ensure its fluidity. Generally speaking, this temperature of advantageously from about 100° C to about 140° C. The amine (II) is thoroughly blended into the molten bitumen. Following this, the temperature of the molten mass is raised to a level of from about 140° C to about 200° C to ensure continued fluidity after the addition of the isocyanate component is made. Isocyanate (III) is slowly blended into the mixture and agitation is continued until homogeneity is reached. The order of addition of amine and isocyanate to the bitumen is not critical. Thus, the isocyanate can be added initially to be followed by the amine. However, in keeping with good safety practices, the former mode of addition is preferred in order to minimize the time in which a hot isocyanate is being handled.

The molten bituminous composition is cast into any desired shape, or mold, and allowed to cool. Its R. & B. softening value is determined according to the procedure set forth in ASTM Test D36-26.

Alternatively, the molten bitumen sample can be divided into two portions, one portion blended with the amine, the other blended with the isocyanate. These portions can be raised in temperature to a level of from about 140° C to about 200° C then blended with each other and thoroughly agitated to provide the bituminous compositions of the present invention.

The temperature to which the bitumen is raised depends on the type of amine and isocyanate employed, and, particularly, on their weight percent content. Obviously, the higher weight percentages will require the higher temperatures. However, the particular range which is chosen from within the broad range of 140° C to about 200° C, is not critical and can be easily determined by a few sample experiments.

Further, the weight percent of a particular amine (II) and isocyanate (III) combination, required to give rise to a particular R. & B. softening value, can be easily determined by trial and error. Insofar as practical working ranges are concerned, the most advantageous one for the total weight of amine plus isocyanate, is from about 1 to about 10 weight percent of the bitumen. Although it is possible to attain even higher R. & B. values by the addition of combinations in excess of 10 weight percent, such practice is generally not desirable.

Although the mechanism, by which the benefits of the present invention arise, is not well understood, it is assumed that at least in part, it entails the formation of urea linkages (IV) by the reaction of the amine with the isocyanate according to the well known equation,

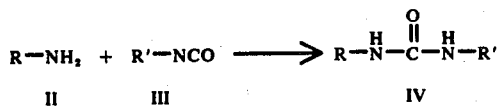

Accordingly, when (II) is an aliphatic amine combined with an aromatic polyisocyanate (III), or an aromatic polyamine (II) combined with an aliphatic isocyanate (III), then the corresponding urea products can be considered as having a monomeric polyurea structure, wherein at least two separate urea groups are present. Contrastingly, when (II) is an aromatic polyamine combined with an aromatic polyisocyanate (III), then the urea product can be considered as having a polymeric polyurea structure wherein the polymer is linked through recurring urea linkages.

The total weight of the amine component plus isocyanate component is advantageously from about 1 to about 10 weight percent of the bitumen weight, and preferably from about 2 to about 8 weight percent. For example, a bituminous composition made in accordance with the present invention wherein 100 parts of bitumen is treated with 1 part of (II) and 1 part of (III), contains 2 weight percent of the combination of (I) and (II).

Further, the amine (II) is advantageous employed in an amount within the range of 0.25 to 3.0 equivalents per equivalent of the isocyanate (III), and preferably within the range of 0.25 to 2.0 equivalents per equivalent of (III).

Surprisingly, a critical feature in the preparation of the bituminous compositions of the present invention is that the amine and isocyanate components must be reacted in-situ, in the molten bitumen material. Otherwise, the advantageous properties which flow from such compositions are not obtained. For example, when an aliphatic amine (II) and an aromatic polyisocyanate (III) are reacted to form a polyurea compound and the powdered urea added at 8 weight percent to a bitumen sample at 200° - 220° C, the resulting R. & B. softening point of the bitumen sample is raised only an insignificant amount, it at all (see Example 1, Runs 17-19). Moreover, polyureas when prepared independently of the bitumen, are not usually soluble therein; see Encyclopedia of Polymer Science and Technology, supra, p. 429-430.

Furthermore, when the amine component (II) is substituted by a diol, to form a polyurethane with the isocyanate (III), either in-situ in the bitumen, or prepared separately therefrom and added later, the R. & B. softening points are not raised significantly above the normal bitumen range (see Example 5).

A further surprising and critical feature of the present invention is that the treatment of the bitumen (I) with the components (II), and (III), must be carried out in the absence of solvent and at elevated temperature i.e. with the bitumen in molten condition. Thus, the bituminous compositions of the present invention are entirely different with respect to their R. & B. softening points, from the bituminous cutback compositions of the prior art wherein the cutback solvent has been completely removed. For example, the prior art teaches the in-situ formation of minor amounts of a monomeric disubstituted urea in a bituminous cutback solution; see U.S. Pat. No. 3,615,802. Removal of the cutback solvent provides a bituminous composition which does not possess a significantly elevated R. & B. softening point (see Example 6).

The bitumen (I) used as the starting material, is defined hereinabove and includes any natural, or synthetically prepared, asphalt, tar, or pitch.

The aliphatic amines (II) used in the practice of the present invention are as defined hereinabove. Illustrative of the alkylamines are decylamine, dodecylamine, tetradecylamine, hexadecylamine, octadecylamine, eisosanylamine, and the like. Illustrative of the alkenylamines are decenylamine, dodecenylamine, tetradecenylamine, hexadecenylamine, octadecenylamine, eicosenylamine, and the like. Further illustrative of said amines are mixtures of alkyl-and alkenylamines, for example, cocoamine which consists of the following mixture: 2% decylamine, 53% dodecylamine, 24% tetradecylamine, 11% hexadecylamine, 5% octadecylamine, and 5% octadecenylamine; and tallowamine which consists of the following: 4% tetradecylamine, 29% hexadecylamine, 20% octadecylamine, and 47% octadecenylamine. A preferred group of aliphatic amines consists of cocoamine, and tallowamine.

The aromatic polyamines (II) used in the present invention are as defined hereinabove. Illustrative of said polyamines are m-phenylenediamine, p- phenylenediamine, 2,4-toluenediamine, 2,6-toluenediamine, 4,4'-methylenebis(aniline), 2,4'-methylenebis(aniline), and the polymethylene polyphenyl polyamines which comprise a mixture of methylene bridged polyphenyl polyamines containing from about 30 to about 85 percent by weight of methylenebis(aniline), the remainder of the mixture being methylene bridged polyphenyl polyamines having a functionality higher than 2; see for example U.S. Pat. No. 2,683,730, 2,950,263, and 3,012,008; Canadian Pat. No. 700,026; and German Specification No. 1,131,877. A preferred group of aromatic polyamines consists of 4,4'-, and 2,4'-methylenebis(aniline), and the polyamine comprising a mixture of methylene bridged polyphenyl polyamines containing from about 30 to about 85 percent by weight of methylenebis(aniline), the remainder of the mixture being methylene bridged polyphenyl polyamines having a functionality higher than 2.

The aliphatic isocyanates (III) used in the present invention are as defined hereinabove. Illustrative of the alkylisocyanates are decylisocyanate, dodecylisocyanate, tetradecylisocyanate, hexadecylisocyanate, octadecylisocyanate, eicosanylisocyanate, and mixtures thereof. Illustrative of the alkenylisocyanates are decenylisocyanate, dodecenylisocyanate, tetradecenylisocyanate, hexadecenylisocyanate, octadecenylisocyanate, eicosenylisocyanate, and mixtures thereof. A preferred aliphatic isocyanate consists of a mixture of about 70% by weight of octadecylisocyanate and about 30% by weight of hexadecylisocyanate.

The aromatic polyisocyanates (III) used in the present invention are as defined hereinabove. Illustrative of said polyisocyanates are m-phenylenediisocyanate, p-phenylenediisocyanate, 2,4-toluenediisocyanate, 2,6-toluenediisocyanate, 4,4'-methylenebis(phenylisocyanate), 2,4'-methylenebis(phenylisocyanate), the polymethylene polyphenylpolyisocyanates which comprise a mixture of methylene bridged polyphenylpolyisocyanates containing from about 30 to about 85% by weight of methylenebis(phenylisocyanate), the remainder of the mixture being methylene bridged polyphenylpolyisocyanates having a functionality higher than 2 (see for example U.S. Pat. Nos. 2,683,730, 2,950,263, and 3,012,008; Canadian Patent 700,026; and German Specification 1,131,877), and the liquified methylenebis(phenylisocyanates), see U.S. Pat. No. 3,384,653. A preferred group of aromatic polyisocyanates consists of 4,4'- and 2,4'-methylenebis(phenylisocyanate), the polymethylene polyphenylpolyisocyanates which comprise a mixture of methylene bridged polyphenylpolyisocyanates containing from about 30 to about 85% by weight of methylenebis(phenylisocyanate) the remainder of the mixture being methylene bridged polyphenylpolyisocyanates having a functionality higher than 2, and the liquified methylenebis(phenylisocyanates).

The bituminous compositions of the invention can also include any of the additives, fillers, and the like conventionally employed in the art. Additives, such as mineral fillers, aggregates, and fibers, improve such properties as toughness, tensile strength, and the like. Inclusive of this class of additives are asbestos fibers, clay, silica, sulfur, iron oxide, and the like. Organic additives are also contemplated within the teachings of the present invention. Typically useful organic additives consist of cotton linters, ground wood, cork, cellulose, various resins, such as polyvinylchloride, polyethylene, rubber, and the like.

The bituminous compositions of the present invention are useful in such applications as road surfaces, roof coatings, sealants, caulks, cable coatings, adhesives, mastics, and in the preparation of various kinds of laminated papers and pressed boards. The bituminous compositions of the present invention find particular utility in bituminous road surfacing, and roofing, in countries which have high, or tropic-like temperatures.

The following examples describe the manner and process of making and using the invention and set forth the best mode contemplated by the inventors of carrying out the invention but are not to be construed as limiting.

EXAMPLE 1

The following bituminous compositions, Runs 3 to 16, Table I, were prepared in accordance with the present invention using the combinations of amine (II) and isocyanate (III) set forth. The presence of excess (II) or (III), over and above the stoichiometric amount required to form the theoretical urea content noted in Table I, is indicated by the multiple amount of equivalents, where (1X) represents stoichiometry.

To 100 g. of steeped asphalt heated to about 135° C in a 500 ml. beaker there was added the grams of amine expressed in Table I as weight percent values. The amine was thoroughly blended into the asphalt using a spatula. The asphalt temperature was raised to 170° C followed by the slow addition of the grams of polyisocyanate expressed in Table I as weight percent values. Agitation was continued by puddling the molten bituminous mass for approximately 2 minutes. A completely homogeneous mass resulted wherefrom a sample was removed for the determination of the Ring & Ball (R. & B.) softening point in accordance with ASTM Test D36-26.

R. & B. softening points record the first temperature point when a test ball of the apparatus, sinks into the softening bitumen sample to the point where it is flush with a reference ring. The second temperature point records the temperature when the ball drops completely through the sample and strikes a metal plate. A standard Ring and Ball Softening Point apparatus, supplied by Arthur N. Thomas Co., Philadelphia, Pa., was used. The heating medium employed was ethylene glycol heated at a rate of 8°–10° C per minute.

Run 1 was the softening point determination of an untreated steeped asphalt sample. Run 2 was a sample of the asphalt wherein the experimental procedure outlined above was carried out, including the heating cycle, except that Polyisocyanate A alone was used, and no significant rise in R. & B. was observed.

For purposes of comparison runs 17 to 19 were bituminous compositions not prepared in accordance with the present invention wherein each contained 8 weight percent of a preformed urea compound prepared from the amine-isocyanate combination indicated. The urea samples were prepared by refluxing the amine with the indicated excess of Polyisocyanate A shown in Table I, in benzene for 2 hours. Removal of the benzene provided the solid ureas which were then powdered, stirred into the steeped asphalt at 200 to 220° C and stirring contained for one-half hour. The increases in R. & B. values, even at the high concentration of 8 weight %, were very slight in comparison with the increases observed in the runs carried out in accordance with the invention.

TABLE I

| Run | Amine(wt.%) | Isocyanate(wt.%) | Urea Content (wt.%) | Excess Reagent* | R.&B.S.P.**(° C) |
|---|---|---|---|---|---|
| 1 | — | — | — | — | 81 – 85 |
| 2 | — | Polyisocyanate A¹(1%) | — | — | 83 – 90 |
| 3 | Cocoamine²(1%) | Polyisocyanate A (1%) | 1.5% | 1.87X Isocyanate | 107 – 114 |
| 4 | Cocoamine(2.8%) | Polyisocyanate A (1%) | 2.84% | 1.5X Amine | 82 – 86 |
| 5 | Cocoamine(3.8%) | Polyisocyanate A (1%) | 2.9% | 2X Amine | 86 – 92 |
| 6 | Cocoamine (2%) | Polyisocyanate A (1%) | 3.0% | Stoichiometric | 90 – 95 |
| 7 | Cocoamine (2%) | Polyisocyanate A (2%) | 3.0% | 1.87X Isocyanate | 115 – 121 |
| 8 | Cocoamine (2%) | Polyisocyanate A (3%) | 3.0% | 2.8X Isocyanate | 122 – 130 |
| 9 | Cocoamine (2%) | Polyisocyanate A (4%) | 3.0% | 3.75X Isocyanate | 180 – 200 |
| 10 | Cocoamine (4%) | Polyisocyanate A (3%) | 6.1% | 1.4X Isocyanate | 127 – 137 |
| 11 | Cocoamine (4%) | Polyisocyanate A (4%) | 6.5% | 1.88X Isocyanate | 134 – 141 |
| 12 | Tallowamine³(2%) | Polyisocyanate B⁴(2%) | 3.0% | 1.5X Isocyanate | 96 – 105 |
| 13 | Tallowamine (4%) | Polyisocyanate B (2%) | 5.0% | 1.35X Amine | 125 – 135 |
| 14 | Tallowamine (4%) | Polyisocyanate B (4%) | 6.7% | 1.5X Isocyanate | 117 – 132 |
| 15 | Polyamine A⁵(2%) | Tonco - 70⁶(2%) | 2.7% | 2.9X Amine | 92 – 103 |
| 16 | Polyamine A (4%) | Tonco - 70 (4%) | 5.4% | 2.9X Amine | 102 – 110 |
| ≠17 | Tallowamine | Polyisocyanate A | 8.0% | 2X Isocyanate | 89 – 93 |
| ≠18 | Cocoamine | Polyisocyanate A | 8.0% | 2.9X Isocyanate | 89 – 93 |
| ≠19 | Cocoamine | Polyisocyanate A | 8.0% | 1.9X Isocyanate | 78 – 85 |

*Excess expressed as the multiple of the equivalents required for stoichiometry, where (1X) represents stoichiometric proportion.
**Ring and Ball softening point measured in accordance with ASTM Test D36-26
≠Powdered urea added to bitumen during stirring and heated for 0.5 hr. at 200 – 220° C (ureas prepared with the excess isocyanate indicated)
¹Polyisocyanate A: A mixture of methylene bridged polyphenyl polyisocyanates which contains about 43 percent to about 45 percent of methylenebis(-phenylisocyanate), the remainder of the mixture being methylene bridged polyphenyl polyisocyanates having a functionality higher than 2; Isocyanate Eq. = 141.
²Cocoamine: A mixture of alkyl-and alkenylamines, comprising, 2% $C_{10}$, 53% $C_{12}$, 24% $C_{14}$, 11% $C_{16}$, 5% $C_{18}$, and 5% unsaturated $C_{18}$; Amine Eq. = 265; supplied by Humko Products, Division of Kraftco Corp., Memphis, Tennessee.
³Tallowamine: A mixture of alkyl-and alkenylamines comprising, 4% $C_{14}$, 29% $C_{16}$, 20% $C_{18}$, 47% unsaturated $C_{18}$; Amine Eq. = 207; supplied by Humko Products, Division of Kraftco Corp., Memphis, Tennessee.
⁴Polyisocyanate B: A mixture of methylene bridged polyphenyl polyisocyanates similar to Polyisocyanate A but with a methylenebis(phenylisocyanate) content of about 50 percent; Isocyanate Eq. = 139.
⁵Polyamine A: A mixture of methylene bridged polyphenyl polyamines which contains about 45 percent of methylenebis(aniline) the remainder of the mixture being methylene bridged polyphenyl polyamines having a functionality higher than 2; Amine Eq. = 103.
⁶Tonco - 70: Registered trademark for the 70/30 mixture of octadecylisocyanate and hexadecylisocyanate supplied by The Upjohn Company, Polymer Chemicals Division, Kalamazoo, Michigan.

EXAMPLE 2

Using the procedure and steeped asphalt set forth in Example 1, and the amine - isocyanate combinations set forth in Table II, there are prepared bituminous compositions, Runs 20 to 31, in accordance with the present invention, wherein the corresponding monomeric polyureas are prepared at 5 weight percent in-situ.

TABLE II

| Run | Amine | Isocyanate |
|---|---|---|
| 20 | Decylamine | 2,4-Toluenediisocyanate |
| 21 | Dodecylamine | 2,4-Toluenediisocyanate |
| 22 | Hexadecylamine | 2,4-Toluenediisocyanate |
| 23 | Octadecylamine | Polyisocyanate A |
| 24 | Decenylamine | Polyisocyanate A |
| 25 | Hexadecenylamine | Polyisocyanate A |
| 26 | 2,4-Toluenediamine | Decylisocyanate |
| 27 | Methylenebis(aniline) | Dodecylisocyanate |
| 28 | Methylenebis(aniline) | Hexadecylisocyanate |

TABLE II-continued

| Run | Amine | Isocyanate |
|---|---|---|
| 29 | Methylenebis(aniline) | Octadecylisocyanate |
| 30 | Methylenebis(aniline) | Decenylisocyanate |
| 31 | Methylenebis(aniline) | Hexadecenylisocyanate |

EXAMPLE 3

Using the steeped asphalt, and the procedure set forth in Example 1, with the aromatic polyamine and aromatic polyisocyanate combinations set forth in Table III, there were prepared the bituminous compositions, Runs 32 to 41, in accordance with the present invention wherein the corresponding polymeric polyureas were prepared in-situ at the weight percent values set forth in Table III.

TABLE III

| Run | Polyamine (wt.%) | Polyisocyanate (wt.%) | Urea Content (wt.%) | Excess reagent | R.& B.S.P.(° C) |
|---|---|---|---|---|---|
| 32 | Methylenebis(aniline (0.5%) | Methylenebis(phenyl-isocyanate) (0.6%) | 1.1% | Stoichiometric | 96 – 102 |
| 33 | Polyamine A (1%) | Polyisocyanate A (1%) | 1.77% | 1.3X Amine | 110 – 120 |
| 34 | Polyamine A (1%) | Liquid Methylenebis¹ (phenylisocyanate) (2%) | 2.4% | 1.4X Isocyanate | 105 – 114 |
| 35 | Polyamine A (2%) | Liquid Methylenebis (phenylisocyanate) (2%) | 3.43% | 1.4X Amine | 112 – 118 |
| 36 | Polyamine A (2%) | Polyisocyanate A (2%) | 3.55% | 1.3X Amine | 125 – 130 |
| 37 | Polyamine A (2%) | Polyisocyanate C²(2%) | 3.55% | 1.3X Amine | 110 – 120 |
| 38 | Methylenebis(aniline) (2%) | Methylenebis(phenyl-isocyanate) (2.5%) | 4.5% | Stoichiometric | 180 – 190 |
| 39 | Polyamine A (2%) | Polyisocyanate B (2.8%) | 4.8% | Stoichiometric | 110 – 116 |
| 40 | Polyamine A (3%) | Polyisocyanate C (3%) | 5.32% | 1.3X Amine | 147 – 158 |
| 41 | Polyamine A (3%) | Polyisocyanate B (4.1%) | 7.1% | Stoichiometric | 122 – 130 |

¹Liquid methylenebis(phenylisocyanate): A liquid diisocyanate prepared in accordance with U. S. Patent 3,384,653 from methylenebis(phenylisocyanate); Isocyanate Eq. = 144
²Polyisocyanate C: A polyisocyanate mixture similar to Polyisocyanate A and B, except the methylenebis(phenylisocyanate) content is about 70 percent; Isocyanate Eq. = 130

EXAMPLE 4

Using 100 g. of dead level asphalt and the procedure set forth in Example 1, with the amine-isocyanate combinations set forth in Table IV, there were prepared the 5 corresponding bituminous compositions, Runs 43 to 45, in accordance with the present invention. The quantities of either monomeric polyurea, or polymeric polyurea employed are set forth in Table IV hereinbelow. Dead level asphalt is a self leveling bitumen which has the very low R. & B. observed value of 53° – 57° C (Run 42).

TABLE IV

| Run | Amine (wt. %) | Isocyanate (wt.%) | Urea Content (wt.%) | Excess Reagent | R. & B.S.P. (° C) |
|---|---|---|---|---|---|
| 42 | — | — | — | — | 53 – 57 |
| 43 | Cocoamine (1%) | polyisocyanate A(1%) | 1.5% | 1.87X Isocyanate | 60 – 64 |
| 44 | Methylenebis (aniline) (1%) | Methylenebis(phenylisocyanate) (1%) | 1.8% | 1.25X Amine | 61 – 65 |
| 45 | Cocoamine (4%) | Polyisocyanate A (4%) | 6.5% | 1.88X Isocyanate | 142 – 143 |

EXAMPLE 5

For purposes of comparison a series of bituminous compositions, Runs 47 to 50, not in accordance with the present invention were prepared using the procedure set forth in Example 1, wherein the grams of isocyanates set forth in Table V (expressed as weight %), were reacted with the indicated amount of diol to form polyurethanes in-situ, in 100 g. samples of dead level asphalt. The diol was a polytetramethyleneetherglycol of Equiv. Wt.=500 (Teracol-1000, supplied by DuPont Company, Wilmington, Delaware).

The theoretical urethane content as weight percent per 100 grams of asphalt, is set forth in Table V along with the excess isocyanate where applicable. Neither a maximum 10 weight percent combination (Run 49), nor a 4 times excess of isocyanate (Run 50) could raise the R. & B. value appreciably above the control of 53°–57° C (Run 46).

Run 51 sets forth the experiment wherein 10 grams of a preformed powdered, 80 Shore A polyurethane elastomer was added to 100 g. of molten dead level asphalt at about 180° C, stirred to a homogeneous mass, and cooled. No increase in R. & B. was observed.

TABLE V

| Run | Diol (wt.%) | Isocyanate(wt.%) | Polyurethane Content(wt.%) | Excess Reagent | R. & B.S.P. (° C) |
|---|---|---|---|---|---|
| 46 | — | — | — | — | 53 – 57 |
| 47 | (5%) | Polyisocyanate A (5%) | 6.4% | 3.5X Isocyanate | 58 – 64 |
| 48 | (5%) | Polyisocyanate A (2.5%) | 6.4% | 1.7X Isocyanate | 59 – 64 |
| 49 | (8%) | Methylenebis (phenylisocyanate) (2%) | 10% | Stoichiometric | 58 – 63 |
| 50 | (5%) | Methylenebis (phenylisocyanate) (5%) | 6.3% | 4X Isocyanate | 53 – 58 |
| 51 | — | — | 10*% | — | 53 – 57 |

*10 wt.% of a powdered polyurethane elastomer prepared from methylenebis(phenylisocyanate), a polytetramethyleneetherglycol(M.W.1000) and butanediol extender, characterized by Shore A value of 80.

EXAMPLE 6

For purposes of comparison, the following example sets forth a bitumen-urea cutback combination prepared in accordance with U.S. Pat. No. 3,615,802. Thereafter, complete solvent removal provides a bituminous composition not in accordance with the present invention.

A sample of steeped asphalt (R. & B.S.P.=81°–85° C), 50 g., was dissolved in 50 g. of toluene, followed by the addition of 5.3 g. of cocoamine and 2.8 g. of Polyisocyanate A. The mixture was stirred vigorously with a spatula for about 5 minutes to form an 8 weight percent solution of the monomeric polyurea in the 100 g. of bituminous cutback blend. The urea formation caused a thickening, or slight gelation, of the blend.

Complete removal of toluene was accomplished by heating the blend in a rotary evaporator apparatus under a pressure of about 0.1 mm. of mercury, until the 50 g. solvent loss was recorded. The R. & B. value for this sample was 78°–82° C i.e. substantially unchanged from that of the starting material.

We claim:
1. A bituminous composition having an elevated softening point said composition consisting essentially of the product obtained by treating bitumen, in the molten state at a temperature of from about 100° C to about 200° C and in the absence of solvent, with a combination of:
   a. an amine selected from the class consisting of aliphatic monoamines having from 10 to 20 carbon atoms, inclusive, and aromatic polyamines selected from the class consisting of arylene diamines having 6 to 12 carbon atoms in the arylene radical and polyamines having the structure

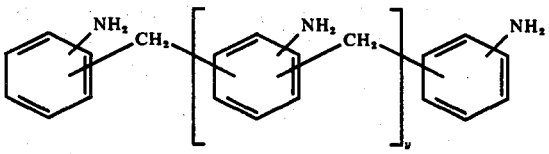

wherein Y is 0 or a number having an average value from 0 to 1; and
   b. an isocyanate selected from the class consisting of aliphatic monoisocyanates having from 10 to 20 carbon atoms, and aromatic polyisocyanates selected from the class consisting of arylene diisocyanates having 6 to 12 carbon atoms in the arylene radical and polyisocyanates having the structure

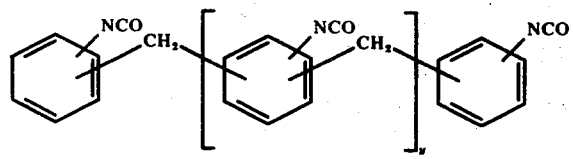

wherein Y is 0 or a number having an average value from 0 to 1 provided that, in any instance in which the amine component (a) is aliphatic the isocyanate component (b) is aromatic; and provided further that amine component (a) is employed in an amount within the range of 0.25 to 3.0 equivalents per equivalent of the isocyanate component (b) and the total weight of amine component (a) plus isocyanate component (b) is from about 1 to about 10 weight percent of said bitumen.

2. A bituminous composition according to claim 1 wherein said amine (a) is an aromatic polyamine selected from the class consisting of arylene diamines having 6 to 12 carbon atoms in the arylene radical and polyamines having the structure

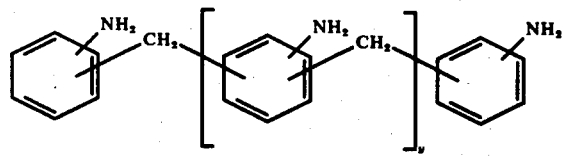

wherein Y is 0 or a number having an average value from 0 to 1 and said isocyanate (b) is an aromatic polyisocyanate selected from the class consisting of arylene diisocyanates having 6 to 12 carbon atoms in the arylene radical and polyisocyanates having the structure

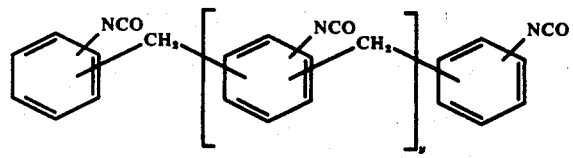

wherein Y is 0 or a number having an average value from 0 to 1.

3. A bituminous composition according to claim 1 wherein said amine (a) is an aromatic polyamine selected from the class consisting of arylene diamines having 6 to 12 carbon atoms in the arylene radical and polyamines having the structure

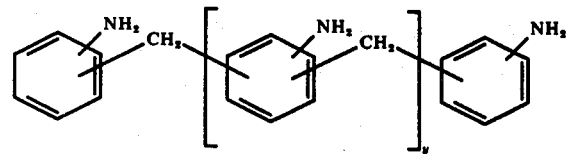

wherein Y is 0 or a number having an average value from 0 to 1 and said isocyanate (b) is an aliphatic monoisocyanate.

4. A bituminous composition according to claim 3 wherein said polyamine is a composition comprising a mixture of methylene bridged polyphenylpolyamines containing from about 30 to about 85 percent by weight of methylene bis(aniline), the remainder of the mixture being methylene bridged polyphenylpolyamines having a functionality higher than 2; and said isocyanate is a mixture having a functionality higher than 2; and said isocyanate is a mixture comprising about 70 percent by weight of octadecylisocyanate and about 30 percent by weight of hexadecylisocyanate.

5. A bituminous composition according to claim 1 wherein said amine (a) is an aliphatic monoamine and said isocyanate (b) is an aromatic polyisocyanate selected from the class consisting of arylene diisocyanates having 6 to 12 carbon atoms in the arylene radical and polyisocyanates having the structure

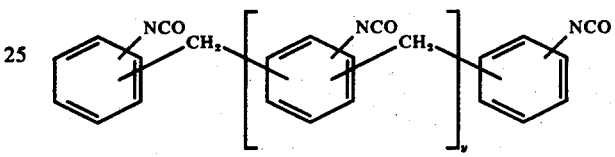

wherein Y is 0 or a number having an average value from 0 to 1.

6. A bituminous composition according to claim 5 wherein said amine is cocoamine; and said polyisocyanate is a composition comprising a mixture of methylene bridged polyphenylpolyisocyanates containing from about 30 to about 85 percent by weight of methylenebis(phenylisocyanate), the remainder of the mixture being methylene bridged polyphenylpolyisocyanates having a functionality higher than 2.

7. A bituminous composition having an elevated softening point said composition consisting essentially of the product obtained by treating bitumen, in the molten state at a temperature of from about 100° C to about 200° C and in the absence of solvent, with a combination of:

a. cocoamine; and b. a mixture of methylene bridged polyphenylpolyisocyanates which contains about 50 percent by weight of methylenebis(phenylisocyanate), the remainder being methylene bridged polyphenylpolyisocyanates having a functionality higher than 2;

provided that amine component (a) is employed in an amount within the range of 0.25 to 3.0 equivalents per equivalent of the isocyanate component (b), and the total weight of component (a) plus component (b) is from about 1 to about 10 weight percent of said bitumen.

* * * * *

UNITED STATES PATENT OFFICE
CERTIFICATE OF CORRECTION

Patent No. 4,032,355   Dated   June 28, 1977

Inventor(s) Alexander McLaughlin and Adnan A. R. Sayigh by Anne B. Sayigh, conservatrix It is certified that error appears in the above-identified patent and that said Letters Patent are hereby corrected as shown below:

Column 2, line 62:   Should read:

temperature of     temperature is

Column 4, line 53:   Should read:

eisosanylamine     eicosanylamine

Column 7, Table III:   Should read:

32 Methylenebis(aniline     32 Methylenebis(aniline)

Column 12, Claim 4, lines 11-13:

Delete from lines 11 to 13 "and said isocyanate is a mixture having a functionality higher than 2;"

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*